June 28, 1960     E. M. BOWEN     2,942,729

WORK INSPECTING MECHANISM

Filed March 13, 1952     7 Sheets-Sheet 1

INVENTOR
Earl M. Bowen
By Carlson, Pitzner, Hubbard & Wolfe
ATTORNEYS

E. M. BOWEN 2,942,729

WORK INSPECTING MECHANISM

Filed March 13, 1952

INVENTOR
Earl M. Bowen
By Carlson, Pitzner, Hubbard, Wolfe
ATTORNEY

June 28, 1960 E. M. BOWEN 2,942,729
WORK INSPECTING MECHANISM
Filed March 13, 1952 7 Sheets-Sheet 7

INVENTOR
Earl M. Bowen
By Carlson, Pitzner, Hubbard, & Wolfe
ATTORNEY

United States Patent Office 2,942,729
Patented June 28, 1960

2,942,729

WORK INSPECTING MECHANISM

Earl M. Bowen, Rockford, Ill., assignor to The Ingersoll Milling Machine Company, Rockford, Ill., a corporation of Illinois Filed Mar. 13, 1952, Ser. No. 276,406

14 Claims. (Cl. 209—88)

This invention relates to the inspection of workpieces in connection with the machining thereof particularly in machine tools of the type in which a material removing operation is performed on the interior of a workpiece by a motion at an angle to the direction of insertion of the tool into the workpiece.

One object is to provide a machine tool of the above character having a novel mechanism operable prior to the machining operation to inspect the workpiece and detect defects which would interfere with the movement of the tool and its support during entry into the work or during the subsequent movement of the support to effect machining of the work by the tool.

A more detailed object is to inspect a workpiece in the above manner through the use of a feeler correlated in shape with the space occupied by the tool and its support and with the movement of the latter after entry of the tool to an operating position with the workpiece.

A further object is to interrupt the insertion of the inspection feeler into the workpieces as soon as a defect or interference between the feeler and the work surface has been detected.

Another object is to utilize the contacting parts of the workpiece and feeler as an electric switch to signal the detection of a defect in the workpiece being inspected.

Still another object is to detect the presence of nonconductive as well as conductive interferences on the wall of the work recess.

The invention also resides in the novel manner of mounting the inspecting feeler, of ejecting defective workpieces, and of recording the location of the defect on the workpiece.

Other objects and advantages of the invention will become apparent from the following detailed description taken in connection with the accompanying drawings, in which.

While the invention is applicable to a wide variety of machine tools and types of workpieces, it is shown in the drawings by way of illustration associated with a machine for boring the cam shaft holes 10 in the crosswebs 11 in the cylinder block casting 12 of an internal combustion engine. The particular boring machine and the mechanism for transferring the blocks are disclosed in Patent No. 2,160,476 to which reference may be had for further details.

In a boring machine of the above character, the blocks 12 are supported open end up on stationary rails 13 along which the blocks are slid endwise into a machining station 14 where each block is transferred onto rails 15 on the top of a platen 16 mounted for vertical movement on a base 17 by which the conveyor rails 13 are supported.

Figure 3:
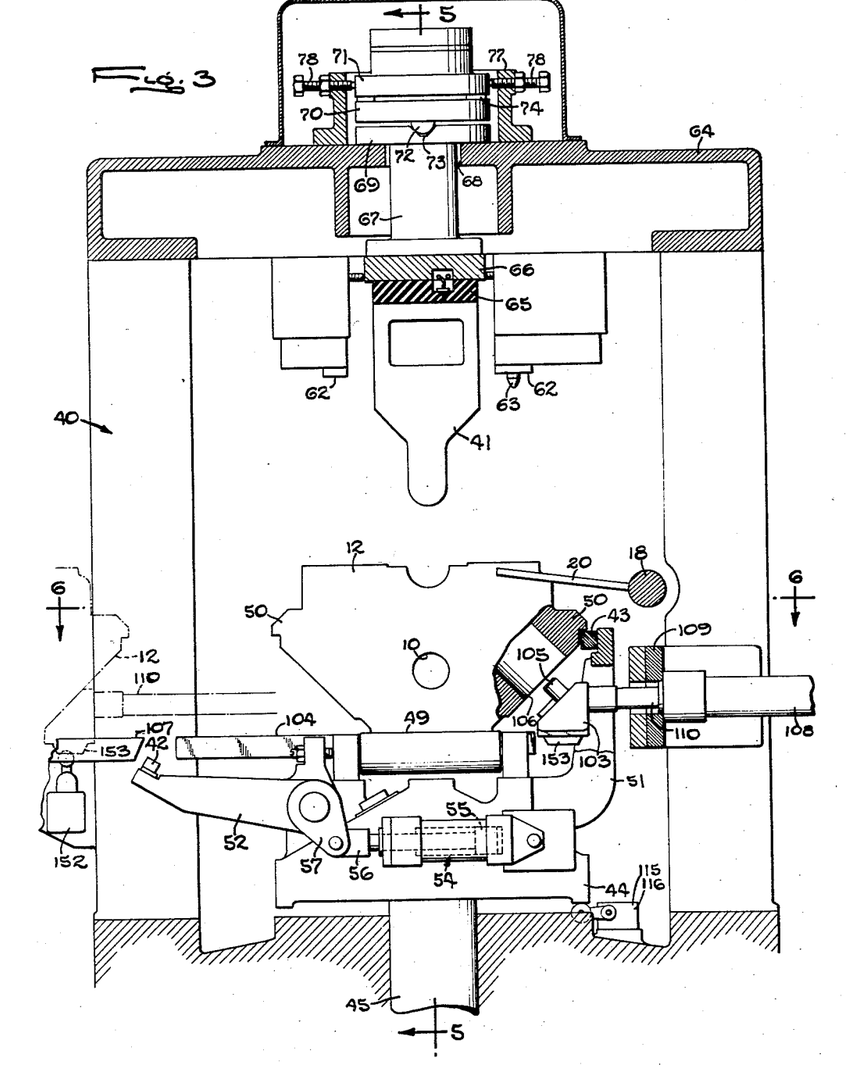
Figs. 3 and 4 are fragmentary vertical sections taken along the line 3—3 of Fig. 1 showing different positions of the parts.
Figure 4:
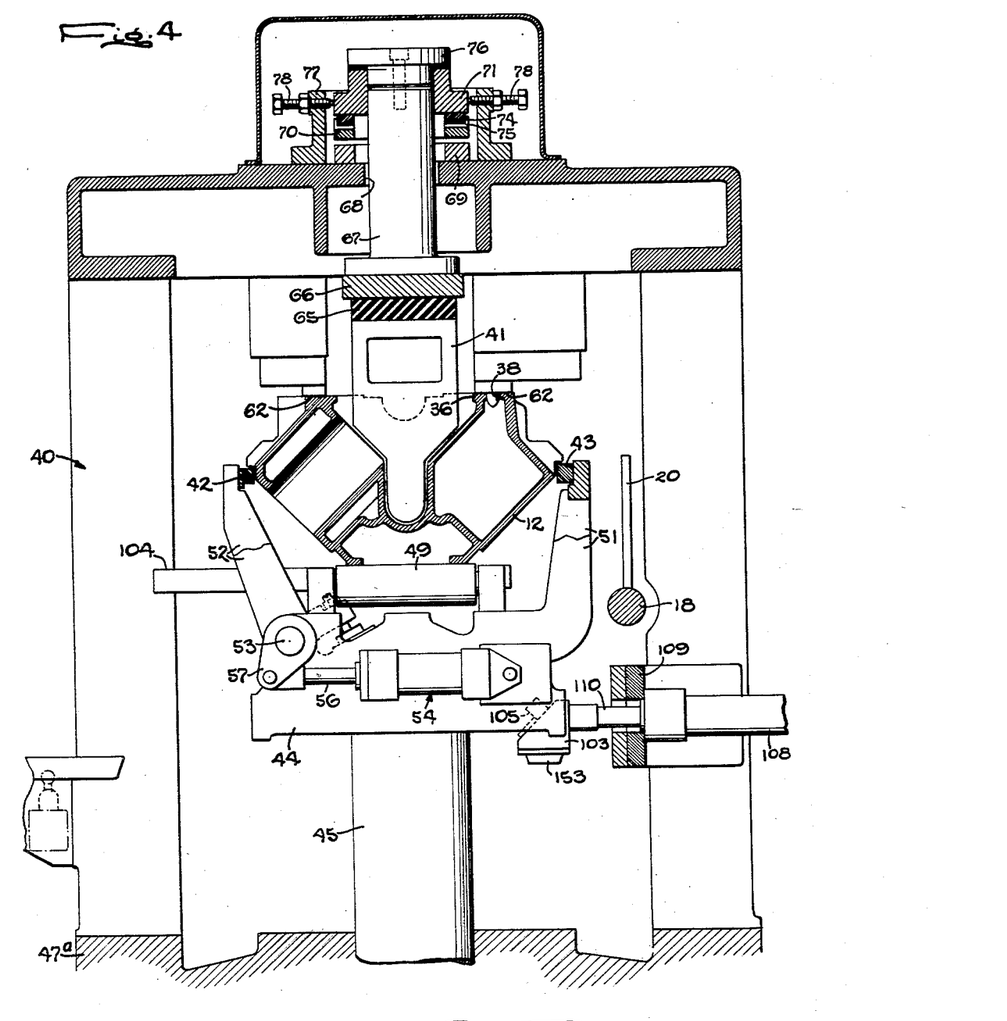
Figure 7:
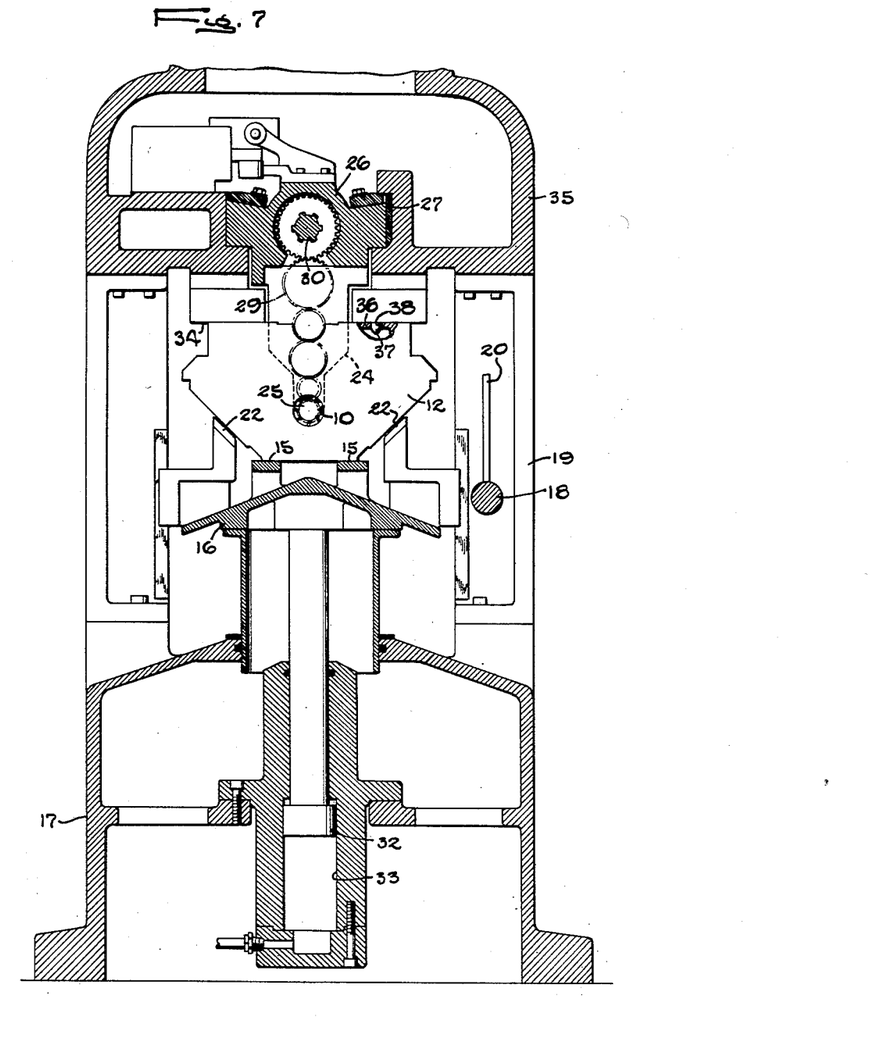
Fig. 7 is a section taken on the line 7—7 of Fig. 1.

Transfer of the workpieces step by step along the conveyor and location of each piece on the rails 15 with the required accuracy may be effected by a bar 18 mounted on the machine frame 19 for endwise reciprocation and also for turning in opposite directions to carry laterally projecting arms 20 on the bar into and out of overlapping relation (Figs. 3 and 7) with respect to the leading and trailing ends of each workpiece 12 in the row. Through a suitable handle 21 (Fig. 1) or if desired by a suitable power actuator as shown in the above mentioned patent, the bar 18 may, when the arms 20 are in active position (Fig. 3), be shifted endwise to advance a machined workpiece out of the station 14 and bring the next piece on the conveyor 13 into position on the rails 15. Then, after the bar has been turned to swing the arms out of engagement with the ends of the workpiece as shown in Figs. 4 and 7, it may be retracted endwise preparatory to picking up the next workpieces by the respective sets of arms. The extent of the shuttle motions of the bar 18 are determined by suitable stops one of which is indicated at 18ª (Fig. 1) and positioned to effect accurate endwise location of each workpiece moved into the station 14.

Figures 1, 2:
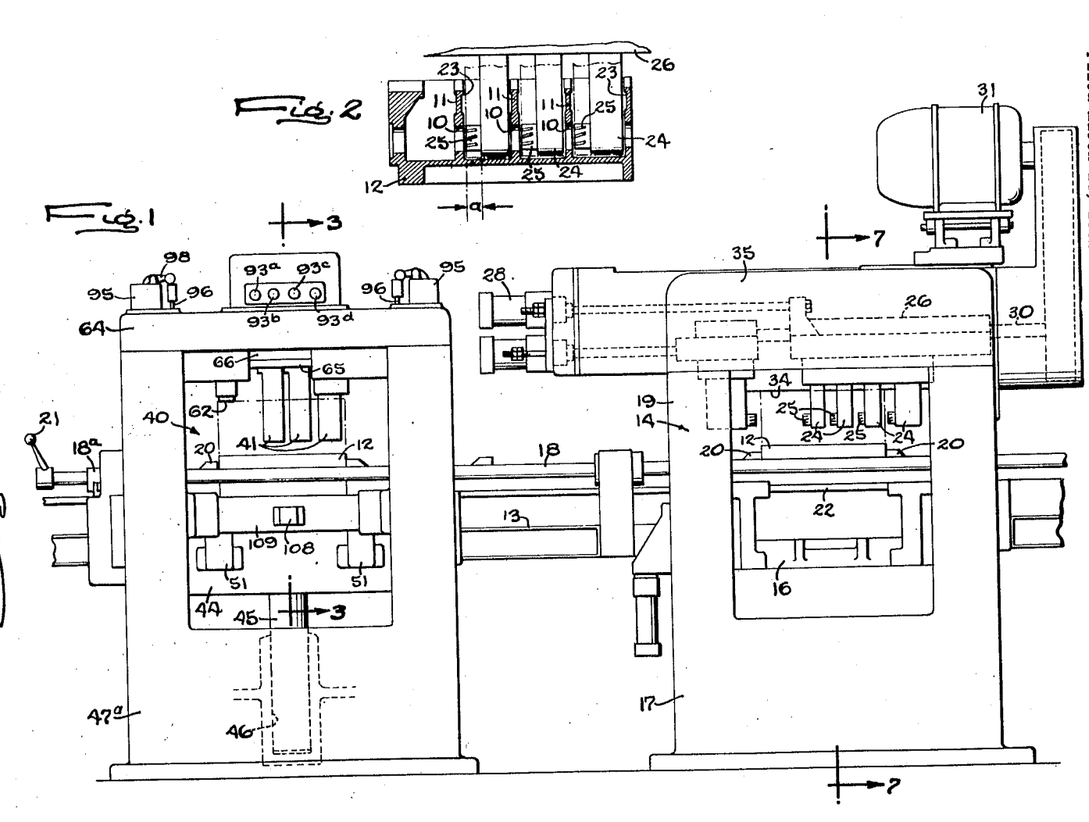
Figure 1 is a fragmentary front elevational view of the improved inspecting mechanism and an associated machine tool.
Fig. 2 is a longitudinal sectional view of the workpiece showing the tools for boring holes therein.

At the end of the transfer motion, the workpiece in the station 14 is disposed between side rails 22 and located endwise with the recesses 23 between the adjacent crosswebs 11 in vertical alinement with depending projections 24 carrying cutters 25 for boring the holes 10 in the respective crosswebs. The projections are rigid with a slide 26 reciprocable in an overhead guideway 27 in a horizontal bridge 35 on top of the machine frame, the slide being fed back and forth by a hydraulic actuator 28 (Fig. 1). The cutters 25 project horizontally from the lower ends of the supports 24 along which spur gear drive trains 29 are extended from a spline drive shaft 30 driven from a motor 31.

The platen 16 is on the upper end of the rod of a piston 32 movable in a vertical cylinder 33 to raise the workpiece on the platen into clamping engagement with downwardly facing abutments 34 on the bridge 35 of the machine frame. As the crankcase flange 36 (Fig. 7) of the workpiece approaches the abutments in the upward movement of the platen, downwardly projecting dowel pins 37 enter holes 38 in the flange and effect accurate lateral positioning of the workpiece by the time the latter comes into clamping engagement against the abutments as shown in Fig. 7. At this time, the cutters 25 will be alined properly as shown in Fig. 2 with the holes 10 which are bored by energizing the actuator 28 to feed the slide 26 and the cutter supports a distance $a$ (Fig. 2) thus projecting the cutters through the holes 10 and the crosswebs 11. After retraction of the slide 26, the platen 16 is lowered to the level of the conveyor rails 13 thereby permitting transfer of the machined workpiece to the right and out of the station 14 while the next piece is, in the same motion of the transfer bar 18, brought into the station.

In order to support the cutter 25 with the proper rigidity during the boring operation, it is desirable to make the tool-supporting projections 24 of maximum width in a direction axially of the cutters. Thus, as shown in Fig. 2, the outer end of each cutter is disposed close to the web 11 to be bored during entry of the cutter into the work recess 23 and the opposite side of the projection 24 is similarly disposed close to the adjacent web. Therefore, to permit proper entry of each tool and its support followed by feeding of the cutter through the proper distance *a* to effect the boring, the workpiece recesses 23 must be relatively uniform in size and shape within comparatively close limits.

The present invention aims to inspect the recesses 23 of each workpiece before the latter is presented to the boring station 14 and indicate or discard any pieces whose walls are imperfectly formed to such an extent as to interfere with the proper entry and feeding of the tool in the boring operation above described. Herein, such inspection takes place at a station 40 spaced along the line of transfer of the workpieces ahead of the boring station 14 and equipped with feelers 41 which are adapted to enter the workpiece recesses 23 and contact any projections or irregularities that would later interfere with the boring operation.

In the inspecting station which is of the same general construction as the boring station 14, each workpiece is slid by the transfer bar 18 in between side rails 42, 43 (Fig. 4) and onto a platen 44 on the upper end of a piston 45 slidable in a vertical cylinder 46 in a base 47ª. To raise the workpiece and thus enter the feelers 41 in the recesses 23 thereof, fluid pressure from a suitable source (not shown) is admitted to the lower end of the cylinder 46 upon energization of a solenoid 47 to shift a valve 48 out of the normal position shown in Fig. 8. When the other solenoid 49ª is energized, the valve is opened to release fluid from the cylinders and permit lowering of the platen 44.

The workpiece rests on rollers 49 on the top of the platen 44 and, in the rest position of the piece, flanges 50 at opposite sides thereof overlie the rails 42 and 43. The latter rail is supported by arms 51 upstanding from the platen while the rail 42 is carried by arms 52 fast on a rock shaft 53 journaled on and along one side of the platen for movement between a normal raised position (Fig. 4) and a retracted position (Fig. 3) below the level of the platen rollers 49. Movement of the arms 52 is effected by a hydraulic actuator 54 (Figs. 3, 4 and 8) mounted on the platen 44 with its piston 55 joined by a link 56 to an arm 57 on the rockshaft. The flow of pressure fluid from a suitable source to opposite ends of the actuator 54 is controlled by a valve 58 (Fig. 8) urged to the normal position shown by a spring 59 and reversed by energization of a solenoid 60 to cause pressure fluid to be admitted to the actuator 54 to retract or lower the rail 42 as shown in Fig. 3.

The workpiece to be inspected is located quite accurately on the platen 44 by the relatively close fit between the side rails 42 and 43 and by the stop limiting the endwise movement of the transfer bar 18. It is desirable, however, to dowel the piece laterally and longitudinally into a definite position as it approaches downwardly facing locating abutments 62 in the final upward movement of the platen. This is accomplished by tapered pins 63 (Figs. 3 and 4) projecting downwardly from the abutments and adapted to enter the holes 38 in the crankcase flange 36 of the workpiece the same as at the boring station previously described. The abutments 62 comprise horizontal bars secured to the underside of a bridge 64 at the top of the inspecting machine frame.

Each of the feelers 41 comprises a block of metal of the same external contour as the tool head including the corresponding cutter 25 and its support 24 in fully entering the workpiece and also the additional space subsequently traversed by the tool support in moving horizontally to the position shown in phantom in Fig. 2 to feed the cutter through the web 11 to bore the hole 10 as described above. Thus, the feeler block is of a thickness only slightly less than the thickness of the cutter support 24 plus the axial length of the cutter 25 which length, in this instance, substantially equals the length of the distance *a* (Fig. 2) through which the cutter is fed axially to complete the boring of the hole 10. Similarly, the transverse shape of the feeler block 41 below the point of maximum horizontal width is as shown in Figs. 3 and 4 substantially the same as the projection of the cutter 25 and its support 24 on a plane perpendicular to the cutter axis.

Figure 5:
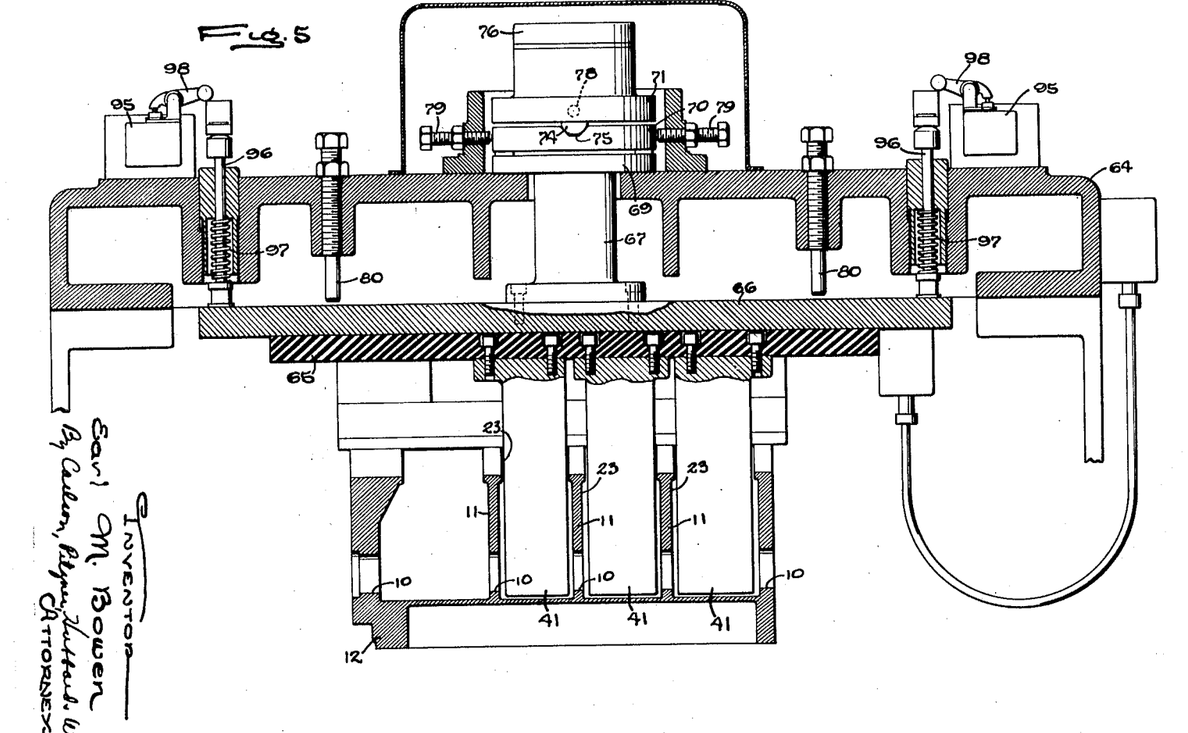
Figs. 5 and 6 are fragmentary sections taken respectively on the lines 5—5 and 6—6 of Fig. 3.

In the present instance, the several feeler blocks 41 project downwardly from and are separately bolted in the proper spaced relation onto a rigid plate 65 (Figs. 3, 4 and 5) of insulation which in turn is suspended from the bridge 64 of the inspecting machine to allow some lateral yielding of the feelers when an obstruction is encountered during their entry into the recesses of the workpieces. To this end, the plate 65 is secured to a bar 66 bolted near its center to the lower end of a rod 67 which projects upwardly through a hole 68 (Fig. 4) in the bridge 64 and through three rings 69, 70 and 71 the lowermost of which rests on and is secured to the bridge. Depending from the diametrically opposite sides of the next ring 70 are rounded lugs 72 (Fig. 3) seated in notches 73 in the ring 69. Similarly formed on the under side of the ring 71 but along a perpendicular diameter are lugs 74 (Fig. 5) seated in notches 75 in the top of the ring 70. A head 76 secured to the upper end of the rod 67 rests on the uppermost ring 71. The supporting joint thus formed permits the feeler carrying plate 65 to swivel universally.

Provision is made for adjusting the axis of the universal joint laterally thus facilitating location of the feelers 41 in proper relation with respect to the recesses 23 in the located workpiece on the platen 44. To this end, the rings 69, 70 and 71 are surrounded by a collar 77 upstanding from the bridge 64 and carrying radially disposed screws 78 (Fig. 4) engageable along one diameter on opposite sides of the uppermost ring 71. Similar screws 79 (Fig. 5) threading through the collar 77 along a perpendicular diameter bear against opposite sides of the ring 70 to permit transaxial adjustment of the feeler support in the second direction. The extent of the universal rocking of the feeler support may be limited by screws 80 (Fig. 5) threading downwardly through the bridge 64 to points close to the bar 66.

To provide for accurate detection of an internal workpiece defect under most conditions encountered in service use and an indication as to the location of the defect, provision is made for closing a predetermined electric circuit through each feeler and the workpiece in response to engagement or mechanical contact between any part of the wall of the work recess 23 and any point on the surface of the feeler 41 during its entry into the work. For this purpose, the platen 44 supporting the workpiece is connected at 81 (Fig. 8) to the grounded terminal of a power source 82, and the respective feelers 41 are connected through conductors 83 to the windings 84, 85 and 86 of latch type solenoids joined to the other power terminal 87 and having armatures normally biased to inactive position but held in active position by latches 88. Herein, each solenoid controls a normally closed switch and three normally open switches which are closed when the solenoids are energized, the four switches for the solenoid 84 being indicated at 84ª, 84ᵇ, 84ᶜ, and 84ᵈ. The latches of the solenoids are released by energization of coils 89 included in parallel in a circuit 90 which extends through the switch 91 of a time delay relay 92.

Figure 8:
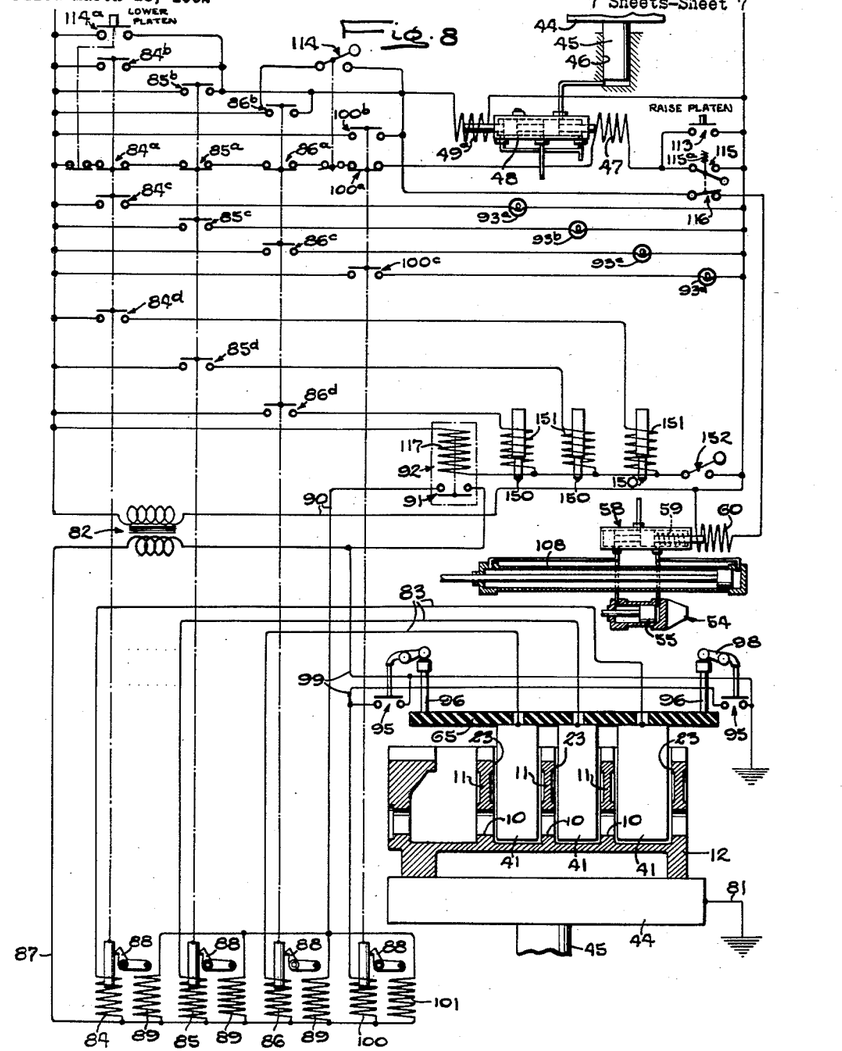
Fig. 8 is a schematic view and circuit diagram.

In the present instance, the switches 84ᶜ, 85ᶜ and 86ᶜ control the energization of lamps 93ª, 93ᵇ, and 93ᶜ which are visible at the front of the inspecting station. The lighting of any one of the lamps during insertion of the feelers 41 as the platen 44 is raised indicates interference between the feeler and the casting being inspected as well as the particular work recess in which the interference exists. The signal is retained until the reset coil 89 of the latched solenoid is later energized as will be described later.

In the case of workpieces made by sand castings, particles of sand sometimes retained on the walls of the work recess 23 may constitute interferences which would preclude proper entry and operation of the tools 25 and at the same time prevent good electric contact between the feeler and the workpiece so as to indicate the defect in the manner described above. A defect of this character would interfere with the proper entry of one of the feelers 41 and cause the latter and the supporting plate 65 to tilt as permitted by the universal mounting of this plate. Such tilting of the plate 65 is utilized to give a separate indication of this different type of work defect through a sensing device which herein takes the form of switches 95 (Figs. 5 and 8) mounted on the bridge 64 and each arranged to be closed by upward movement of a plunger 96 slidable vertically in the bridge and adapted to bear at its lower end against the top of the bar 66. The plungers are urged downwardly by springs 97 and at their upper ends are connected to the actuating pins of the switches through levers 98.

The switches 95 are arranged in parallel in a circuit 99 for energizing the coil of a latch type solenoid 100 for actuating a normally closed switch 100$^a$ and normally open switches 100$^b$ and 100$^c$. Closure of the switch 100$^c$ completes the circuit of an electric signal lamp 93$^d$ to indicate a defect in the casting. It will be apparent that lighting of the lamp 93$^d$ alone while the other lamps remain deenergized is an indication that the defect in the casting being inspected is due to a non-conductive type of interference such as sand on the wall of one of the work recesses. As in the case of the other latch solenoids, the solenoid 100 is reset and the signal terminated by energization of a coil 101.

Through the suspension mounting above described, it will be apparent that each feeler 41 is adapted for universal swiveling about a fulcrum disposed above the supported workpiece, the feeler thus being free to move laterally in any direction from a normal centered position in response to engagement of any point on the side of the feeler with undersize projection on the wall of the work recess. The feeler is urged into this centered position under its own weight.

At the same time, the feeler may be raised vertically as by the lower end encountering an obstruction in the bottom of the work recess. Such vertical movement is permitted by virtue of the separable character of the abutting surfaces 72, 73 and 74, 75 which provide the fulcrum of the universal mounting for the feeler. In response to such vertical shifting of the feeler because of its failure to reach a predetermined depth in the work recess, one or both of the switches 95 will be closed thus signalling the presence of an obstruction, the same as in the case of undersize deviations in the size of the recess wall at the sides of the work cavity.

In accordance with another aspect of the invention, the entry of the feelers into the work is interrupted and preferably the feelers are withdrawn from the work automatically as soon as any type of interference is detected. To this end, the solenoid 49$^a$ which opens the valve 48 to permit lowering of the platen 44 is arranged to be energized in response to closure of any one of the feeler circuits above described. As above described, this results in closure of one of the solenoid switches 84$^b$, 85$^b$, 86$^b$, or 100$^b$ which are connected in parallel between the power terminal and the solenoid winding 49$^a$. Thus, whenever any one of the feelers contacts any part of the work as the feelers are entering the work recess, the supply of pressure fluid to the platen cylinder 46 is interrupted by opening the valve 48, and the platen 44 is lowered immediately thus retracting the workpiece away from the feelers 41. By thus interrupting the entry of the feelers, danger of damaging the feelers and their mounting is avoided. The universal mounting above described allows sufficient lateral deflection of the feelers to prevent damage pending reversal of the platen motion following initial contact between one of the feelers and the wall of the work recess.

Figure 6:
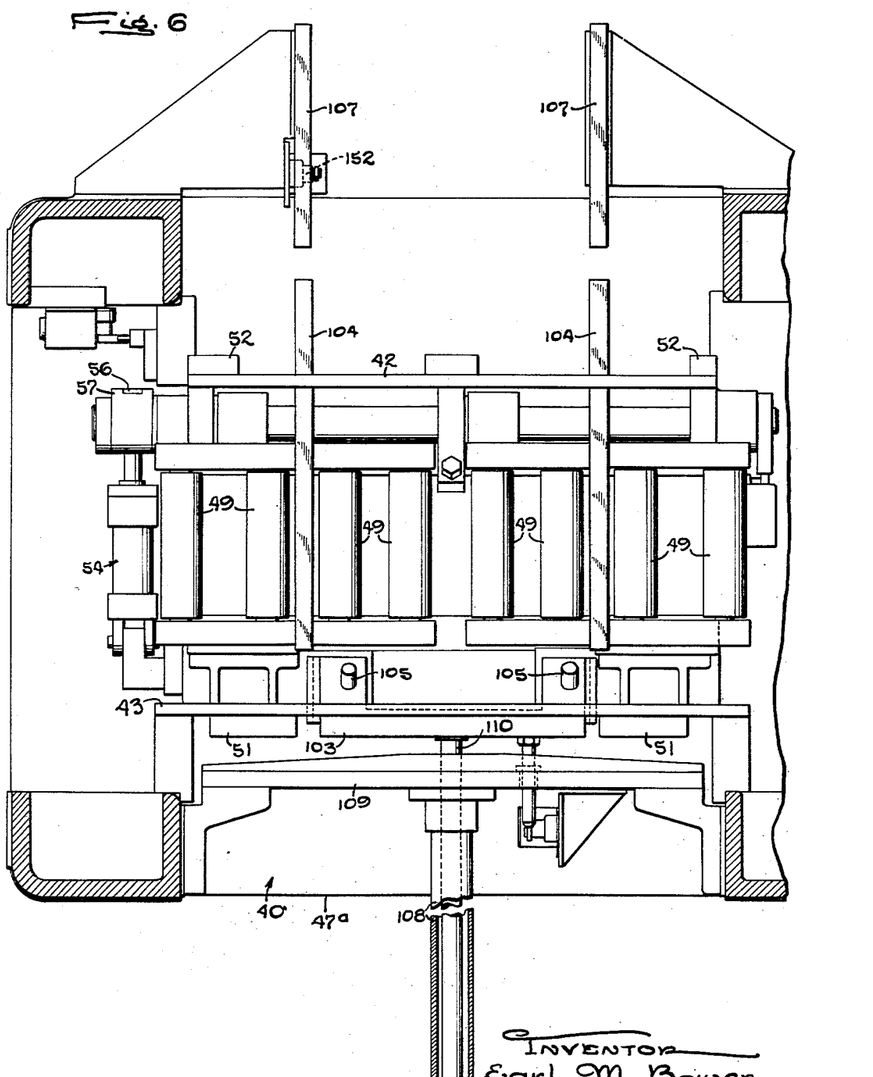

In the present instance, a power actuated ejector is provided for removing each defective workpiece from the inspecting station in a direction transversely of the normal path of movement of the workpieces to the boring machine. Such ejection is effected after lowering of the platen 44 by shifting a bar 103 broadwise across the top of the platen from the retracted position shown in Figs. 3 and 6. In this movement, the bar is guided along the top of rails 104 mounted on the platen between the rollers 49 and spaced projections 105 (Fig. 3) upstanding from the bar come against the ends 106 of cylinder holes in the workpieces and push the latter off from the rollers 49 and beyond the laterally projecting ends of the rails 104 to the position shown in phantom in Fig. 3. In this out of the way position, the ejected block is supported on rails 107 from which it may be removed manually.

The ejector bar 103 is advanced and retracted in the present instance by a hydraulic actuator comprising a cylinder 108 supported at one end of a part 109 of the inspecting machine frame and having a piston therein on a rod 110 fastened to the ejector bar 103. The admission of pressure fluid to the head and rod ends of the cylinder 108 to advance and retract the ejector bar 103 may be controlled by the valve 58 (Fig. 8) above referred to. Movement of the ejector is initiated simultaneously with the retraction of the guide rail 42 so that the latter is retracted out of interfering relation with respect to the workpiece being ejected.

Means is provided for marking on each ejected workpiece the part thereof which was found to be defective in the inspecting operation. This marking means is actuated selectively according to which of the switches 84$^d$, 85$^d$, or 86$^d$ is closed and is rendered active upon complete ejection of the defective workpiece. While the marking means may take various forms such as paint spraying nozzles, printing elements, etc., it is shown in the present instance as comprising a series of tools 150 (Fig. 8) which are mounted on the frame of the inspecting machine for engagement with the exterior of the workpiece in the ejected position of the latter. Herein, the tools are carried by the armatures of solenoids 151 and thus are projected against the workpiece upon energization of the solenoid coils. The latter are connected in series with the respective switches 84$^d$, 85$^d$, and 86$^d$ above referred to and all are in series with a switch 152 which is closed in response to movement of a defective workpiece to the ejected position shown in phantom in Fig. 3. Herein, the switch (see Fig. 3) is closed by a cam 153 on the ejector bar 103 when the latter reaches the end of its stroke as determined by the length of the ejector cylinder 108.

It will be apparent from the foregoing that the contour of the external surface of each of the feelers 41 corresponds to but is somewhat smaller than the desired contour of the wall of the recess 23, that is, the minimum contour this wall may have to permit the cutter and its support to enter without interference and move laterally to effect the machining of the work surface. If the recess wall deviates from this contour at any point along the fixed path of entry of the feeler into the work recess and the undersize deviation is greater than the clearance permissible, the feeler and recess wall will come into contact with each other. The occurrence of such contact will be indicated by completion of the electric circuit as above described if the interfering projection on the recess wall is metallic in character. However, if the interference is due to adhering sand or the like, it will, in the continued advance of the feeler, act as a cam and tilt the feeler laterally about its point of universal suspension. The resulting closure of one of the switches 95 signals the presence of the defect.

*Operation*

While the operation of the inspecting mechanism may be automatic, a manual control will be described. After advance of the transfer bar 18 to bring a previously inspected workpiece into the boring station 14, a new workpiece will be similarly advanced into the inspecting station 40 and thus located quite accurately by the rails 42 and 43 and the arms 20 of the transfer bar with the recesses 23 alined vertically with the feelers 41. The operator then closes a switch 113 (Fig. 8) completing a circuit for the solenoid 47 through the then closed series switches 84ª, 85ª, 86ª, and 100ª. The valve 48 is thus shifted to admit pressure fluid to the lower end of the cylinder 46 thus initiating upward movement of the platen. As the platen starts to rise, a switch 115 (Figs. 3 and 8) urged toward closed position by a spring 115ª is closed thus maintaining the energization of the solenoid 47 independently of the switch 113. At the same time, a switch 116 is opened.

If no interference is encountered by the feelers, the workpiece engages the dowel pins 63 and comes against the abutments 62 without any contact with the feeler surfaces and without tilting of the feeler support 65. The casting having been found to be sound, the platen 44 is lowered by closure of a switch 114 to energize the solenoid 49ª and thereby shift the valve 48 to open position. Such lowering of the platen may be initiated at any desired point in the cycle by closing a corresponding manually operable switch 114ª.

If, during raising of the platen 44 and insertion of the feeler 41 in the workpiece, an obstruction or interference is encountered as evidenced by electrical contact between one of the feelers 41 and a part of the wall of one of the work recesses 23, for example, the terminal recess, a circuit 83 will be completed for energizing the solenoid 84 which results in opening of the switch 84ª and closure of the switches 84ᵇ, 84ᶜ, and 84ᵈ. Closure of the switch 84ᶜ lights the lamp 93ª thus giving a visual signal of the defect and also indicating the part of the workpiece in which the defect is located.

Since the solenoid 47 has been deenergized by opening of the switch 84ª, closure of the switch 84ᵇ completes a circuit for energizing the solenoid 49ª to open the valve 48 and cause immediate lowering of the platen 44. When the latter reaches its lowermost position (Fig. 3), a switch 116 is closed thereby completing a circuit through the switch 84ᵇ to energize the solenoid 60 for reversing the position of the valve 58 thus admitting pressure fluid to the head ends of the cylinder 108 and 55. The rail 42 is retracted out of the way, and the ejector bar 103 is advanced to push the defective workpiece off from the platen 44. When the workpiece reaches the ejected position shown in phantom in Fig. 3, the switch 152 is closed thereby completing a circuit through the then closed switch 84ᵈ for energizing the corresponding solenoid 151 of mark the part of the casting where the defect exists.

Simultaneously with the marking operation, the winding 117 of a time delay relay 92 is energized by closure of the switch 152. Then, after the lapse of a short adjustable interval, the switch 91 is closed by the relay thus completing a circuit for energizing the reset coil 89 of the solenoid 84 thereby releasing the latch of the latter and allowing the condition of the switches 84ª, 84ᵇ, 84ᶜ and 84ᵈ to be reversed. The solenoid 60 is thus deenergized and the valve 58 is shifted by its spring 59 to cause the flow of pressure fluid to the actuators 54 and 108. As a result, the ejector and the rail 42 are returned to normal position and the switch 152 opened to deenergize the timer 92. The inspecting machine is thus ready to receive a new workpiece and start another inspecting cycle.

I claim as my invention:

1. In a work inspecting mechanism, the combination of, a support, a feeler projecting from said support, a joint coupling said support and said feeler together for universal swiveling of the feeler and normally disposing the feeler in a predetermined position, a work support adapted to support a workpiece with a recess therein opening toward said feeler, means for moving said supports toward and away from each other to insert the feeler into said recess and stop the feeler at a predetermined depth, means defining an electric circuit extending through said workpiece and said feeler and adapted normally to be closed by mechanical contact between the two, indicating means activated by closure of said circuit, a device operable to sense tilting movement of said feeler out of said normal position, and a second indicating means activated by said device to indicate a tilting condition of said feeler, said electric circuit and said device being carried by said first support and acting concurrently during insertion of said feeler.

2. In a work inspecting mechanism, the combination of, a support, a feeler projecting from said support, a work support adapted to support a workpiece with a recess therein opening toward said feeler, reversible power actuated means for moving said supports toward and away from each other to insert the feeler into said recess to a predetermined depth, means including said feeler and workpiece for detecting mechanical interference of said feeler by said workpiece during insertion of the feeler into said recess, and means responsive to the detection of said interference for reversing said power actuated means whereby to separate said supports away from each other.

3. An inspecting machine having, in combination, a frame, a downwardly facing abutment, a platen spaced below said abutment and mounted on said frame for up and down movement into and out of engagement with said abutment, a conveyor for supporting open sided workpieces for movement one by one onto and off from said platen when the latter is in a normal lowered position, means for locating each workpiece in a predetermined position on said platen with a recess in the piece opening upwardly, a feeler projecting downwardly from said abutment and adapted to enter a recess in the workpiece on said platen as the latter is raised, said feeler normally entering said workpiece without interference, a power actuator for raising and lowering said platen to insert the feeler to a predetermined depth and then withdraw the feeler from the recess, mechanism including said feeler and workpiece and operable during raising of said platen to detect mechanical contact between said feeler and workpiece, and means controlled by said detecting means and operable to disable said actuator and cause lowering of the platen as soon as said interference is detected.

4. An inspecting machine having, in combination, a frame, a downwardly facing abutment, a platen spaced below said abutment and mounted on said frame for up and down movement into and out of engagement with said abutment, a conveyor for supporting open sided workpieces for movement one by one onto and off from said platen when the latter is in a normal lowered position, means for locating each workpiece in a predetermined position on said platen with a recess in the piece opening upwardly, a feeler projecting downwardly from said abutment and adapted to enter a recess in the workpiece on said platen as the latter is raised, said feeler normally entering said workpiece without interference, a power actuator for raising and lowering said platen to insert the feeler to a predetermined depth in said recess and then withdraw the feeler from the recess, mechanism including the feeler and workpiece and operable during raising of said platen to detect mechanical contact between said feeler and workpiece, means controlled by said detecting means and operable to disable said actuator and cause lowering of the platen as soon as said interference is detected, an auxiliary work support adjacent said platen, an ejector movable across the top of said platen when the latter is lowered and operable to transfer a workpiece off from the platen and onto said auxiliary support, a power operator for advancing and retracting said ejector, and means controlling said operator jointly by said detecting means and movement of said platen and operable to energize the operator upon return of said platen to said lowered position following the detection of interference between said feeler and workpiece.

5. An inspecting machine having, in combination, a support mounted for vertical movement away from and toward a retracted position, said support being adapted to receive a hollow workpiece open side up, a power actuator for raising and lowering said support to and from a predetermined position, a feeler mounted above said support and adapted to normally enter the work recess to a predetermined depth without interference as the support is raised, an ejector movable across the top of said support when the latter is retracted whereby to push a workpiece off from the support, a power operator for advancing and retracting said ejector, means including said feeler and workpiece and operable during upward movement of said support to signal engagement between said feeler and a wall of the work recess, and mechanism responsive to said signal and operable after the subsequent return of said support to said retracted position to energize said operator and eject the workpiece off from said support.

6. An inspecting machine having, in combination, a support for receiving a workpiece with a recess therein opening outwardly, a second support spaced from said first support and having an inspecting feeler projecting therefrom, means for moving said supports toward each other to enter said feeler into said recess and stop the feeler after entry thereof to a predetermined depth in said recess, means including said feeler and workpiece for detecting interference between said feeler and the workpiece during entry thereof, said last mentioned means including a solenoid having an armature and adapted when energized to indicate a defect in said workpiece, means operable upon engagement between said workpiece and said feeler to energize said solenoid, a latch for holding said solenoid armature in energized position, a power actuated ejector adapted when energized to move a workpiece off from said work support, means operable upon energization of said solenoid to initiate return of said work support to retracted position, means jointly responsive to eenrgization of said solenoid and return of said work support to said position to cause advance and retraction of said ejector and mechanism responsive to the return of said ejector to inactive position to release said latch and said solenoid armature.

7. In an inspecting machine, the combination of, a horizontal support adapted to receive workpieces advanced horizontally step by step along a predetermined path, a feeler disposed above and projecting toward said support and adapted to enter a recess in the workpiece upon movement of the feeler and support toward each other, means for relatively moving said feeler and support a predetermined distance to enter the feeler normally to a predetermined depth in said recess, horizontally spaced rails paralleling said path and guiding the workpieces horizontally onto the support into a predetermined position to aline the work recess with said feeler, one of said rails being retractible to a position below said support, a power actuator for raising and lowering said retractible rail to and out of operative position along said support, a power actuated ejector movable forth and back across the top of said support to push a workpiece thereon laterally of said path and off from said support when said retractible rail is in retracted position, means including said feeler and workpiece for detecting engagement between said feeler and a wall of said recess during entry of the feeler therein to thereby indicate a defect in said workpiece, means controlled by said detecting means upon the detection of a defect in the workpiece to reverse the movement of the workpiece and feeler and thereby return the workpiece to said path, and means responsive to such return of the workpiece to energize said rail actuator and said work ejector to transfer the defective workpiece off from said support.

8. In a mechanism for inspecting an outwardly opening recess in a workpiece to sense undersize deviations in the contour of the recess wall from a predetermined desired peripheral and bottom contour, said mechanism having in combination, a support for mounting and locating a workpiece to be inspected in a predetermined position with the recess thereof exposed, a second support disposed opposite and spaced from the open end of said recess, an elongated feeler mounted cantilever fashion on said second support and projecting toward said recess for entry therein along a predetermined path, a power actuator for moving said supports toward and away from each other along said path to project said feeler endwise into said recess progressively including means for interrupting such entry at a predetermined depth, said feeler having end and peripheral surfaces of a contour corresponding to but smaller than said desired contour so that in each of the positions of the feeler along said path, each point on said recess wall is spaced from the opposing point on said feeler by at least a predetermined clearance when the wall is of said desired contour, and means including said feeler and workpiece for signalling the occurrence of mechanical contact between any point on said feeler surfaces and said recess wall in the course of entry of said feeler to said predetermined depth.

9. In a mechanism for inspecting an outwardly opening recess in a workpiece to sense undersize deviations in the contour of the recess wall from a predetermined desired peripheral contour, said mechanism having in combination, a support for mounting and locating a workpiece to be inspected in a predetermined position with the recess thereof exposed, a second support disposed opposite and spaced from the open end of said recess, a feeler mounted on said second support and projecting toward said recess for entry therein along a predetermined path, a power actuator for moving said supports relative to each other along said path to project said feeler into said recess progressively along a predetermined path, said actuator including means for interrupting the movement after entry of the feeler to a predetermined depth in said recess, the free end portion of said feeler having an external peripheral surface of a contour corresponding to but smaller than said desired contour so that in each of the positions of the feeler along said path, each point on said recess wall is spaced from the opposing point on said feeler surface by at least a predetermined clearance when the wall is of said desired contour, means including said feeler and workpiece for signalling the occurrence of mechanical contact between any point on said feeler surface and said wall in the course of entry of said feeler, and mechanism operable in response to such signal to control said actuator and immediately interrupt the advance of the feeler along said path.

10. In a mechanism for inspecting an outwardly opening recess in a metallic workpiece to sense undersize deviations in the contour of the recess wall from a predetermined desired peripheral contour, said mechanism having in combination, a support for mounting and locating a workpiece to be inspected in a predetermined position with the recess thereof exposed, a second support disposed opposite and spaced from the open end of said recess, an elongated feeler mounted on said second support for entry into said recess along a predetermined path extending into said recess, a power actuator for moving said supports relative to each other along said path to enter said feeler into said recess progressively to a predetermined position, said feeler having an external conductive peripheral surface of a contour corresponding to but smaller than said desired contour whereby in all positions of the feeler, each point on said recess wall is spaced from the opposing point on said feeler surface by at least a predetermined clearance when the wall is of said desired contour, an electric circuit extending through said feeler surface and the supported workpiece and normally opened by the clearance between the surface and said recess wall but closed by contact between said recess wall and any point on said feeler surface, and mechanism controlled by said circuit and operable to interrupt the entry of said feeler by said actuator upon the closing of said circuit.

11. In a mechanism for inspecting an outwardly opening recess in a workpiece to sense undersize deviations in the contour of the recess wall from a predetermined desired contour, said mechanism having in combination, a support for mounting and locating a workpiece to be inspected in a predetermined position with the recess thereof exposed, a second support disposed opposite and spaced from the open end of said recess, an elongated feeler projecting along a predetermined path extending into said recess, means disposed externally of the supported workpiece and coupling said feeler and said second support for universal swiveling of the feeler laterally of said path, said feeler being urged toward and normally maintained in a predetermined position with the axis of the feeler extending along and centered laterally of said path, a power actuator for moving said supports relative to each other along said path to enter said feeler into said recess progressively including means for interrupting such entry with the feeler in a predetermined position, said feeler having an external peripheral surface of a contour corresponding to but smaller than said desired contour whereby in all positions of the feeler, each point on said recess wall is spaced from the opposing point on said feeler surface by at least a predetermined clearance when the wall is of said desired contour, means including said feeler and its support for sensing tilting of said feeler out of said centered position by interengagement of said feeler surface and the recess wall, and mechanism controlled by said sensing means and operable to interrupt the entry of said feeler by said actuator upon tilting of the feeler out of said centered position.

12. In a mechanism for inspecting an outwardly opening recess in a metallic workpiece to sense undersize deviations in the contour of the recess wall from a predetermined desired peripheral contour, said mechanism having in combination, a support for mounting and locating a workpiece to be inspected in a predetermined position with the recess thereof exposed, a second support disposed opposite and spaced from the open end of said recess, an elongated feeler projecting toward said recess for entry therein, means on said second support disposed externally of the supported workpiece and including a coupling mounting said feeler cantilever fashion for universal swiveling laterally of a predetermined path, said feeler being urged laterally and normally maintained in a predetermined centered position along said predetermined path, a power actuator for moving said supports relative to each other along said path to enter said feeler into said recess progressively including means to normally interrupt such entry with said feeler in a predetermined position, said feeler having an external peripheral conductive surface of a contour corresponding to but smaller than said desired contour whereby in all positions of the feeler, each point on said recess wall is spaced from the opposing point on said feeler surface by at least a predetermined clearance when the wall is of said desired contour, an electric circuit extending through and including the opposed surfaces of said feeler and the supported workpiece and normally opened by the clearance between the surface and said recess wall, means for sensing tilting of said feeler out of said centered position by engagement of said feeler surface and the recess wall, and mechanism controlled by said circuit and said sensing means and operable to immediately interrupt the entry of said feeler by said actuator either upon the closing of said circuit or upon movement of the feeler out of said centered position.

13. In a mechanism for inspecting an outwardly opening recess in a metallic workpiece to sense undersize deviations in the contour of the recess wall from a predetermined desired contour, said mechanism having in combination, a support for mounting and locating a workpiece to be inspected in a predetermined position with the recess thereof exposed, a second support disposed opposite and spaced from the open end of said recess, an elongated feeler projecting along a predetermined path extending into said recess, means on said second support disposed externally of the supported workpiece and mounting said feeler cantilever fashion for endwise movement along said path and also for universal swiveling laterally of said path, said feeler being urged endwise and normally maintained in a predetermined centered position along said path, a power actuator for moving said supports toward and away from each other along said path to enter said feeler into said recess progressively including means to normally interrupt such entry when the feeler reaches a predetermined depth, said feeler having an external conductive surface of a contour corresponding to but smaller than said desired contour whereby in all positions of the feeler, each point on said recess wall is spaced from the opposing point on said feeler surface by at least a predermined clearance when the wall is of said desired contour, an electric circuit extending through and including the opposed surfaces of said feeler and the supported workpiece and normally opened by the clearance between the surface and said recess wall, means for sensing tilting or endwise movement of said feeler out of said centered position by engagement of said feeler surface and the recess wall, and mechanism controlled by said circuit and said sensing means and operable to interrupt the entry of said feeler by said actuator either upon the closing of said circuit or upon movement of the feeler out of said centered position.

14. In a mechanism for inspecting an outwardly opening recess in a workpiece to sense deviations in the contour of the recess wall from a predetermined desired contour, said mechanism having in combination, a support for mounting and locating a workpiece to be inspected with the recess thereof exposed, a second support disposed opposite and spaced from the open end of said recess, an elongated feeler projecting along a predetermined path extending into said recess, means on said second support disposed externally of the supported workpiece and including a coupling mounting said feeler for universal swiveling in any direction laterally of said path and also for axial movement way from and toward a predetermined position along the path, said feeler being urged toward and normally maintained in said predetermined position with the axis of the feeler extending along and centered laterally of said path, a power actuator for moving said supports relative to each other along said path to enter said feeler into said recess progressively and including means for normally interruption such entry when the feeler reaches a predetermined depth, means for sensing axial movement of said feeler away from said predetermined position or tilting of the feeler axis out of its centered position by engagement of the feeler with an interference within said recess, mechanism controlled by said sensing means and operable to interrupt the entry of said feeler by said actuator upon engagement with such interference.

References Cited in the file of this patent

UNITED STATES PATENTS

| | | |
|---|---|---|
| 1,667,420 | Kent | Apr. 24, 1928 |
| 2,093,429 | Foss | Sept. 21, 1937 |
| 2,160,476 | Kampmeier | May 30, 1939 |
| 2,293,586 | Bardet et al. | Aug. 18, 1942 |
| 2,567,430 | Griffiths | Sept. 11, 1951 |
| 2,571,161 | Poole | Oct. 16, 1951 |
| 2,576,590 | Gentzhorn | Nov. 27, 1951 |
| 2,588,066 | Weisberg | Mar. 4, 1952 |
| 2,659,157 | Aller | Nov. 17, 1953 |
| 2,677,325 | Aller | May 4, 1954 |